United States Patent [19]

Dawson

[11] 3,828,978
[45] Aug. 13, 1974

[54] HAND WASH SYSTEM

[75] Inventor: Clarence G. Dawson, Dallas, Tex.

[73] Assignee: Food Equipment, Inc., Dallas, Tex.

[22] Filed: Aug. 11, 1971

[21] Appl. No.: 170,788

[52] U.S. Cl. .............................. 222/110, 251/294
[51] Int. Cl. ............................................ F16k 31/00
[58] Field of Search ........... 251/231, 242, 243, 294, 251/295; 137/562, 565, 101.27; 134/190, 191, 199; 222/1, 110

[56] References Cited
UNITED STATES PATENTS

| | | | |
|---|---|---|---|
| 1,256,525 | 2/1918 | Dederer | 251/295 X |
| 2,074,554 | 3/1937 | Myron | 251/295 X |
| 2,900,176 | 8/1959 | Krogel | 137/101.27 X |
| 2,959,980 | 11/1960 | Kocour | 251/295 UX |
| 3,111,942 | 11/1963 | Miller | 137/563 X |
| 3,272,393 | 9/1966 | Roeser | 251/295 X |

*Primary Examiner*—Stanley H. Tollberg
*Attorney, Agent, or Firm*—Richards, Harris & Medlock

[57] ABSTRACT

The specification discloses a hand wash system for use by personnel working along a food processing line such as the eviscerating trough of a fowl processing plant. A reservoir supplies warm water through a fluid manifold which extends along the eviscerating trough. A return line may be connected between the end of the manifold to the reservoir for recycling unused water. A plurality of wash stations are spaced along both sides of the eviscerating trough and include conduits which communicate with the manifold. A self-limiting valve is connected in each of the conduits and is operable to allow a predetermined amount of warm water to pass therethrough. An actuating lever is connected to each of the valves and is positioned for movement by an uncontaminated portion of the bodies of the personnel, such as the arms, legs or feet of the personnel. Nozzles are connected to the output of the valves and are disposed over the eviscerating trough for dispensing a metered amount of warm water upon the operation of the actuating levers.

4 Claims, 9 Drawing Figures

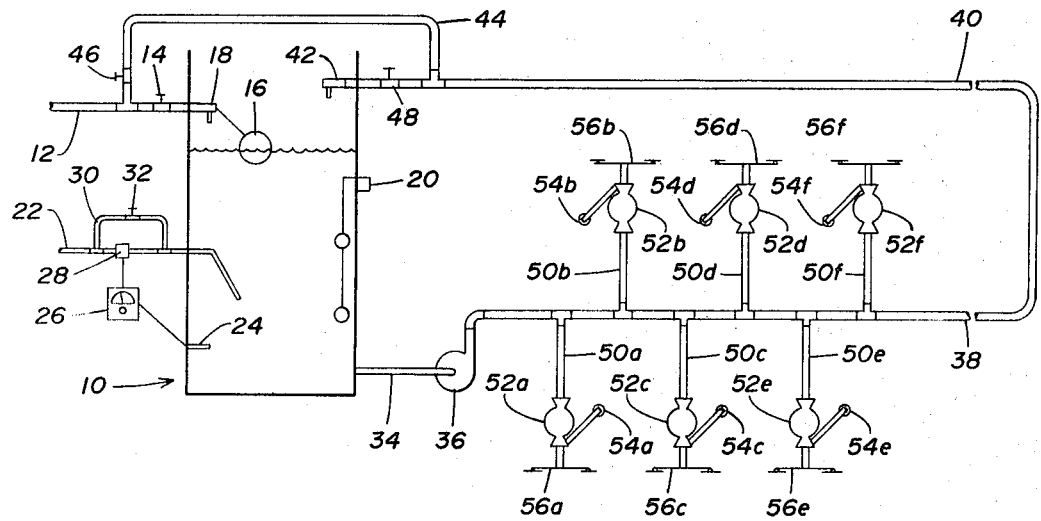
FIG. 1
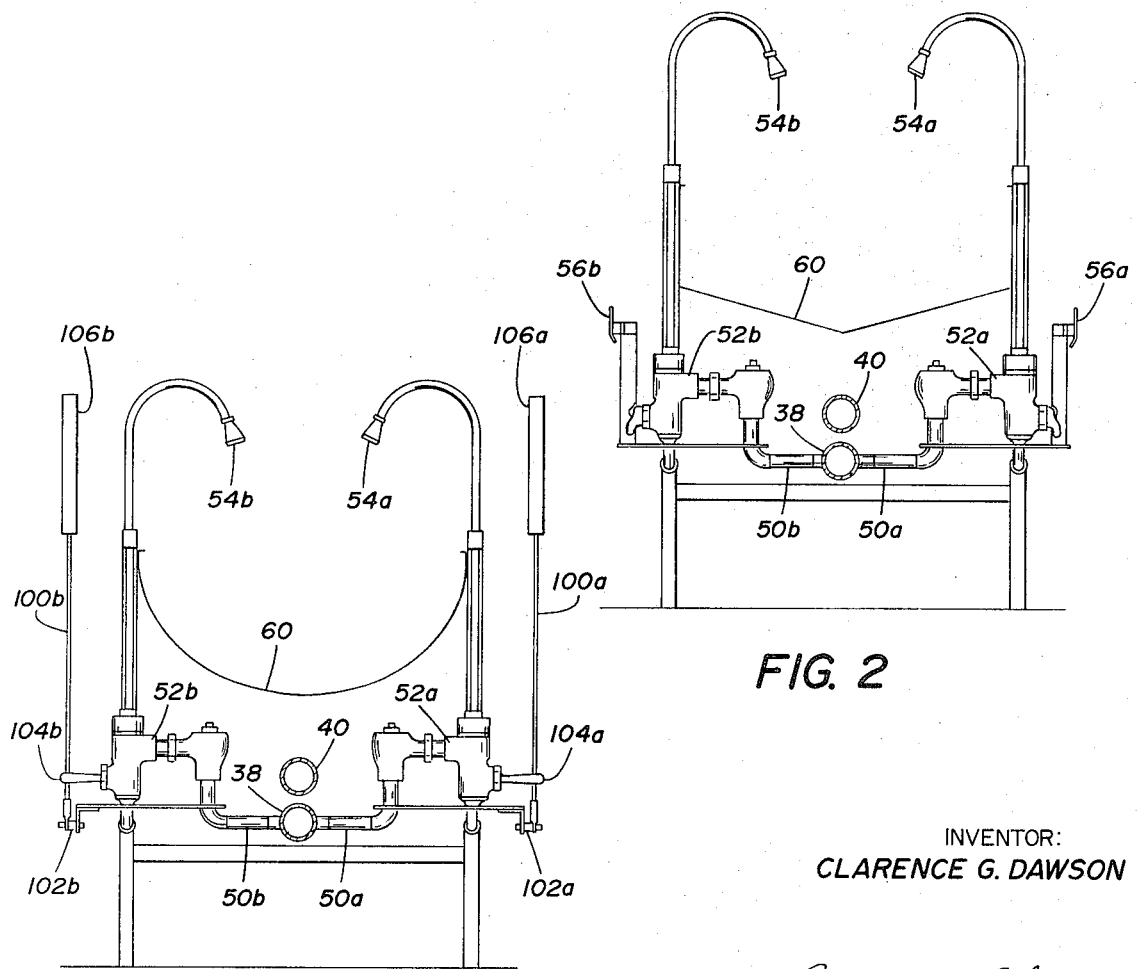
FIG. 2
FIG. 5
INVENTOR:
CLARENCE G. DAWSON
ATTORNEYS

INVENTOR:
CLARENCE G. DAWSON

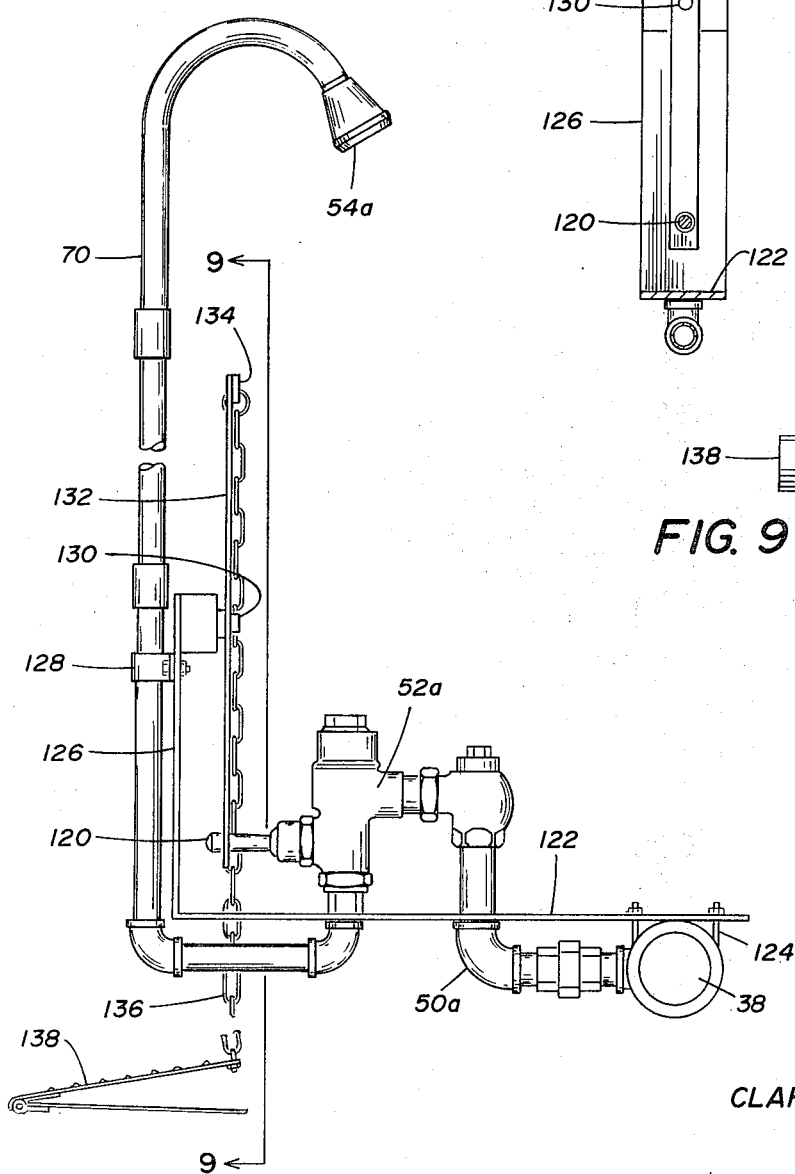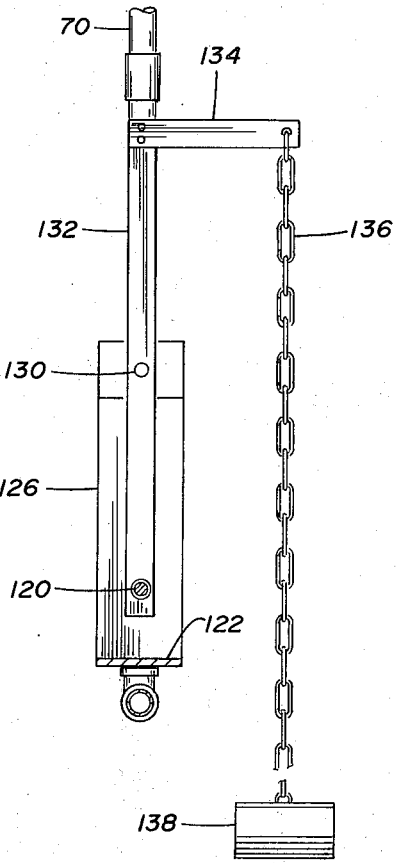

3,828,978

HAND WASH SYSTEM

FIELD OF THE INVENTION

This invention relates to metered fluid dispensing systems, and more particularly relates to hand washing systems for use in animal processing plants.

THE PRIOR ART

In many food processing plants it is desirable and customary for the personnel working in contact with the food to continuously wash their hands during the workday period. For example, in the eviscerating room and other locations in fowl slaughtering and processing plants, it is common practice for the personnel to wash their hands each time they touch another portion of a carcass or a different carcass. Fowl slaughter plants have thus heretofore often provided a pipe carrying fresh water to each worker's station for hand washing purposes.

Since the personnel along a fowl eviscerating line have a predetermined function to perform on each carcass being carried by a continuously running overhead shackle, there is not sufficient time for the personnel to turn a conventional valve on and off in order to wash their hands. Thus, fowl slaughter and processing plants have generally allowed water to continuously run at each work station, even though the personnel only intermittently utilize the running water. Such prior systems have resulted in a great loss of water. In addition, due to the fact that the water continuously runs in such a system, it has not been heretofore possible to utilize a heating system to heat the water, and thus the workers have been required to wash their hands in cold water.

SUMMARY OF THE INVENTION

In accordance with the present invention, a wash system is provided which includes a plurality of spaced apart wash stations each including a fluid dispensing nozzle. A manually operable fluid valve is provided to control the flow of fluid from each nozzle, such that the nozzles are operable to dispense only a predetermined amount of fluid. A fluid conduit connects with each of the valves to provide a supply of fluid from a fluid reservoir. A pump is connected in the fluid conduit for pumping the fluid from the fluid reservoir to the wash stations through the fluid conduit.

In accordance with another aspect of the invention, a hand wash system is provided for personnel working along a fowl processing line. The system includes a plurality of hand wash stations spaced along the fowl processing line. Each of the stations includes a nozzle disposed to dispense fluid on the hands of the personnel. A self-limiting valve is connected to control the flow of the fluid to each of the nozzles. An actuator controls the operation of each of the valves, with the actuator being disposed for actuation by an uncontaminated portion of the bodies of the personnel. A fluid manifold extends along the fowl processing line and is connected to each of the valves to supply pressurized fluid thereto.

In accordance with a more specific aspect of the present invention, a hand wash system is provided for use by personnel along the eviscerating trough of a fowl processing plant. The hand wash system includes a reservoir for providing a supply of warm water. A fluid manifold is connected to said reservoir and extends along the eviscerating trough. A return line is connected between the end of the manifold and the reservoir. A plurality of wash stations are spaced along both sides of the eviscerating trough and include connecting conduits communicating with the manifold. A self-limiting valve is connected in each of the connecting conduits and is operable to allow a predetermined amount of warm water to pass therethrough. An actuating lever is connected to each of the valves and is positioned for movement by an uncontaminated portion of the bodies of the personnel. Nozzles are connected to each of the valves and are disposed over the eviscerating trough for dispensing a metered amount of warm water upon the operation of the actuating levers.

DESCRIPTION OF THE DRAWINGS

For a more complete understanding of the present invention and for further objects and advantages thereof, reference is now made to the following description taken in conjunction with the accompanying drawings, in which:

FIG. 1 is a schematic diagram of a typical hand washing system according to the present invention;

FIG. 2 is a sectional view of the preferred embodiment of the invention;

FIG. 5 is a sectional view of a second embodiment of the invention, illustrating arm actuating levers;

FIG. 8 is a side view of a wash station including a foot-operated valve; and

FIG. 9 is a sectional view of the wash station shown in FIG. 8 taken generally along the lines 9—9.

DESCRIPTION OF THE PREFERRED EMBODIMENTS

Figure 3:
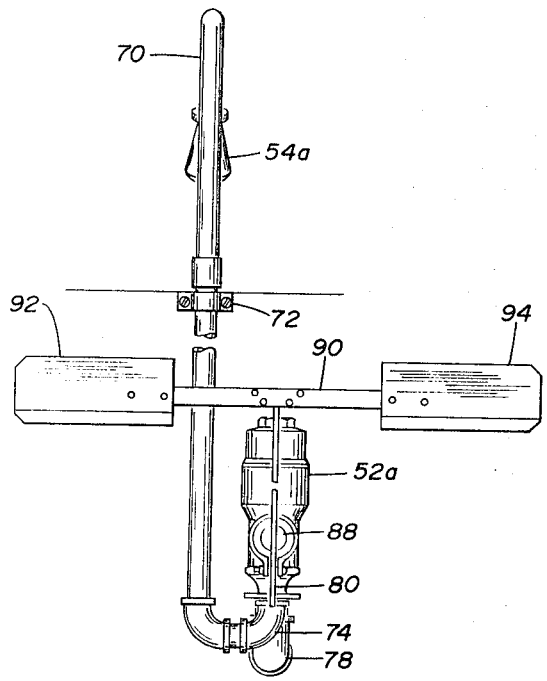
FIG. 3 is a front view, partially broken away, of one of the wash stations shown in FIG. 2.

FIG. 1 illustrates somewhat diagrammatically a multistation hand wash system according to the invention. A reservoir 10 is located in the vicinity of the processing plant and is filled with tap water from the city water supply via an inlet pipe 12. A hand-operated valve 14 is normally open to allow water to fill the reservoir. A float 16 controls the operation of a valve 18 in order to prevent overflow of reservoir 10. A low level switch 20 operates to add water to reservoir 10 when needed. Steam is applied into the lower regions of reservoir 10 via steam inlet pipe 22. The steam heats the water within the reservoir 10 to the desired temperature. A temperature sensitive probe 24 controls a temperature control circuit 26 which operates an automatic valve 28 in order to maintain the desired temperature of the water within the reservoir 10. A manual bypass 30 is controlled by operation of a manual valve 32.

Warm water is applied to the hand wash system via an outlet pipe 34 which feeds a suitable pump 36. Pump 36 applies pressurized warm water through a manifold 38, which is connected at one end to a return line 40. Return line 40 feeds back unused warm water into the reservoir 10 via a pressure regulator 42 which opens only when a predetermined pressure exists in the manifold 38. When the pump 36 runs against the closed system, the system tends to build pressure, thus opening the pressure regulator and feeding the warm water back into the reservoir 10. It will however be understood that in some instances the return line 40 will not be required, but the manifold 38 is merely capped. When the hand stations are being used, the pressure regulator remains closed to prevent bypassing of the water. A manual bypass pipe 44 is provided with a valve 46 which may be opened to operate the system with city water pressure in case the pump 36 malfunctions. When the manual bypass 44 is utilized, valve 14 and a valve 48 and the return line 40 are closed.

A plurality of hand wash stations are spaced along the manifold 38, with connecting conduits 50a-f communicating with the manifold 38 at each of the wash stations. Self-limiting valves 52a-f are connected between the connecting conduits and water spray nozzles 54a-f. While spray nozzles are illustrated, it will be understood that various types of dispensing members may be alternatively used. Actuating levers 56a-f are located for movement by the operators along the fowl processing line in order to operate the selected valves 52a-f. Upon movement of any one of the actuating levers 56a-f, the respective valve is operated in order to deliver a predetermined amount of warm water via the respective nozzle 54a-f upon the hands of the personnel adjacent the water station. An important aspect of the invention is that any of the actuating levers 56a-f may be operated by personnel on either side of the wash station. In the preferred embodiment of the invention, the actuating levers 56a-f are actuated by an uncontaminated portion of the personnel's body, such as by a foot, leg or arm. Due to the fact that the valves 52a-f are self-limiting, warm water is dispensed only when the valve is actuated, thereby preventing waste and substantially reducing the cost of operation of the system.

Figure 4:
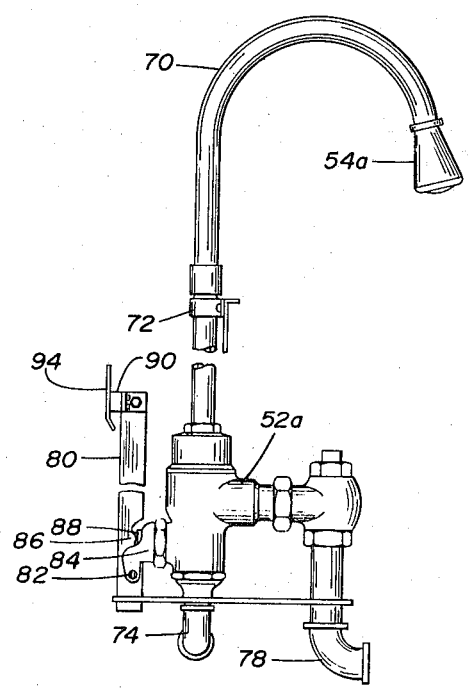
FIG. 4 is a side view of the wash station shown in FIG. 3.

FIGS. 2–4 illustrate in greater detail the preferred embodiment of the invention. FIG. 2 illustrates the position of a pair of nozzles 54a-b over a poultry eviscerating trough 60. As is known, personnel stand along the eviscerating trough and perform various functions on the poultry passing thereabove on an overhead shackle. The supply manifold 38 and the return line 40 are disposed beneath the eviscerating trough 60. Connecting conduits 50a and 50b communicate with the manifold 38 in the manner previously described. Valves 52a-b are disposed between the connecting conduits and the upwardly extending pipes which lead to the nozzles 54a-b. Nozzles 54a-b are located so that water emitted therefrom may be directed upon the hands of the personnel operating along the eviscerating line. The actuating levers 56a-b in this instance are disposed for actuation by the knees of the personnel working on either side of the nozzles. Thus, the hands of the personnel are freed for work upon the poultry passing thereby, and germs and other contaminations are not deposited upon the actuating lever.

Referring specifically to FIGS. 3 and 4, the nozzle 54a is supported by an upwardly extending curved pipe 70 which positions the nozzle to spray the hands of the personnel. The excess water then falls into the eviscerating trough 60 for transportation to the sewage system. The pipe 70 is rigidly connected to the framework of the eviscerating trough by a bracket 72. The pipe 70 is connected through a U-section 74 to the underside of a valve assembly 52a. The valve assembly 52a comprises any suitable mechanical self-limiting valve which when actuated allows the passage of a predetermined amount of fluid. In particular, valves of the type termed The Crown Flush Valves manufactured and sold by the Sloan Valve Company of Chicago, Illinois, have been found to work well. The bypass vent found in such Crown Flush Valves may be enlarged to deliver the desired amount of water through the nozzle 54a.

In the preferred embodiment, one pint of warm water is delivered by the valve 52a in about two and one-half seconds upon actuation of the valve. Pressurized warm water is supplied to the valve through a curved pipe section 78 from the main manifold 38. The actuator lever comprises a vertically extending bar 80 which is pivotally connected at a pivot point 82 to an extension 84 of the valve assembly. A portion 86 of the bar 80 is adapted to abut with and depress the actuating button 88 for operation of the valve assembly 52a. The upper end of the bar 80 is connected to a horizontally extending member 90 having plates 92 and 94 connected at opposite ends thereof. In operation of the system, the personnel on either side of the nozzle 54a may hit the plates 92 or 94 with their knee or other portions of the legs. This causes the bar 80 to be pivoted about the pivot point 84, thereby depressing the button 88 and actuating the valve assembly 52a. The predetermined amount of warm water is then dispensed from the nozzle 54a.

FIG. 5 illustrates another embodiment of the present invention which may be actuated by the arms of the personnel. In this embodiment, the arrangement of the eviscerating trough and the nozzles 54a and 54b are similar to that previously described. The manifold 38 and the return line 40 are again mounted beneath the eviscerating trough 60, with the manifold 38 being connected to the wash station by connecting conduits 50a and 50b. Valve assemblies 52a-b are interconnected between the connecting conduits and the downwardly extending nozzles 54a-b in the manner previously described. In the embodiment shown in FIG. 5, upwardly extending rods 100a-b are pivotally connected at pivot points 102a-b in order to actuate the actuating members 104a-b extending from the valves 52a-b.

Figure 6:
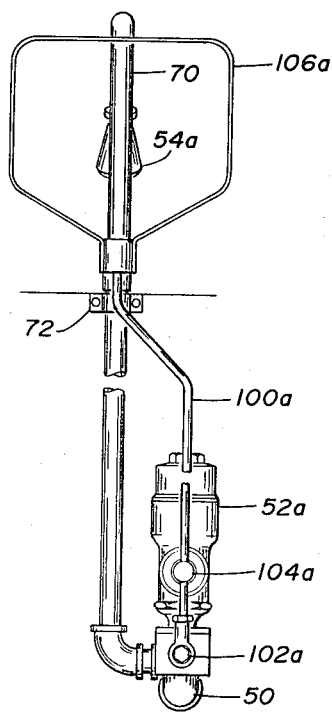
FIG. 6 is a front view, partially broken away, of one of the wash stations shown in FIG. 5.
Figure 7:
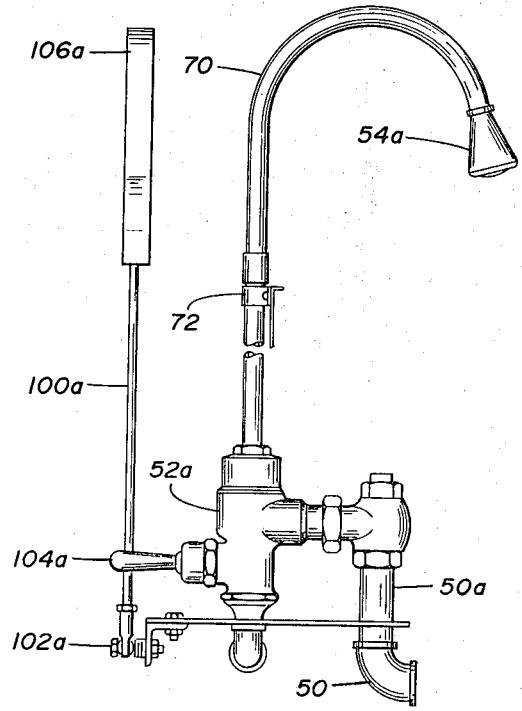
FIG. 7 is a side view of the wash station shown in FIG. 6.

Referring to FIGS. 6 and 7, the structure of one of the wash stations is illustrated in more detail. In a similar manner as that previously described, the nozzle 54a is supported by the curved pipe 70, which is rigidly connected by a bracket 72 to the rigid frame of the eviscerating trough. The lower end of the pipe 70 is connected to the valve 52a in the manner previously described.

A supply of warm water is supplied to valve 52a via the connecting conduit 50a. The upwardly extending rod 100a has attached thereto at the upper end a generally rectangular member 106a. The upwardly extending bar 100a passes through the actuation member 104a of the valve 52a. In operation, personnel on either side of the nozzle 54a may strike the member 106a with their forearm, thereby pivoting the bar 100a about the pivot point 102a and moving the actuation member 104a to thereby actuate the valve 52a. Thereupon, a predetermined supply of warm water is applied through the valve 52a upwardly through the pipe 70 and out the nozzle 54a.

An important aspect of the present invention is that the valve 52a will not deliver a continuous amount of water if the actuating lever is continuously depressed or operated. The actuating lever must be released and moved back to normal position and then reactivated before additional water may be dispensed.

Manifold 38 supplies fluid under pressure through the connecting conduit 50a to the valve 52a in the manner previously described. The valve 52a may be actuated by movement of a lever 120 in the known manner. When the lever 120 is actuated, fluid is supplied via the vertical pipe 70 for dispensing via the nozzle 54a. A framework 122 supports the manifold 38 by a U-shaped bracket 124. The framework 122 includes a vertically extending member 126 which supports the pipe 70 by a bracket 128. A pivot member 130 extends from the member 126 to pivotally support a vertically extending arm 132. The lower end of the arm 132 receives the end of the lever 120. As best shown in FIG. 9, a horizontal extension 134 extends from the arm 132. A linkage such as the chain 136 is connected at the upper end to the extension 134 and extends downwardly for connection to a foot-operable pedal 138. Depression of the pedal 138 causes the arm 132 to pivot about the pivot point 130, thereby actuating the lever 120. The embodiment shown in FIGS. 8 and 9 thus allows an operator to demand hand wash water at any time by merely depressing the pedal 138.

It will thus be understood that the present invention provides an advantageous system for providing sanitary operating conditions in a food or other type of processing environment. In particular, the present invention provides a metered amount of warm water for the hands of personnel working along an eviscerating line of a poultry plant, without the requirement of continuously running water, while yet maintaining high sanitary standards.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A hand wash system for use by personnel along the eviscerating trough of a fowl processing plant comprising:
    a reservoir for providing a supply of warm water,
    a fluid manifold connected to said reservoir and extending along said eviscerating trough
    a return line connected between the end of said manifold and said reservoir,
    a plurality of wash stations spaced along both sides of the eviscerating trough and including connecting conduits communicating with said manifold,
    a self-limiting valve connected in each of said connecting conduits and operable when actuated to allow a predetermined amount of warm water to pass therethrough,
    actuating structure connected to each of said valves and positioned for movement by an uncontaminated portion of the bodies of the personnel, and nozzles connected to the output of said valves and disposed over the eviscerating trough for dispensing a metered amount of warm water upon the operation of said actuating structure.

2. The hand wash system of claim 1 wherein said actuating structure comprises an upwardly extending lever for actuation by the arms of personnel on either side thereof.

3. The hand wash system of claim 1 wherein said actuating structure comprises a laterally extending lever for actuation by the legs of personnel on either side thereof.

4. The hand wash system of claim 1 wherein said actuating structure comprises a linkage connected to a foot-operable member.

* * * * *